United States Patent [19]

Osawa

[11] 4,109,878

[45] Aug. 29, 1978

[54] CASSETTE TAPE WINDING APPARATUS

[75] Inventor: Masayuki Osawa, Tokyo, Japan

[73] Assignee: TDK Electronics Co., Ltd., Tokyo, Japan

[21] Appl. No.: 790,936

[22] Filed: Apr. 26, 1977

[30] Foreign Application Priority Data

Jun. 22, 1976 [JP] Japan ............................ 51-82040[U]

[51] Int. Cl.² .......................................... B65H 17/02
[52] U.S. Cl. ............................................... 242/68.3
[58] Field of Search ....................... 242/68.3, 68.4, 68

[56] References Cited

U.S. PATENT DOCUMENTS

| 2,833,488 | 5/1958 | Kerber | 242/68.3 X |
| 3,249,314 | 5/1966 | Kjos | 242/68.3 |
| 3,946,962 | 3/1976 | Deletzke | 242/68.3 |

Primary Examiner—Edward J. McCarthy
Attorney, Agent, or Firm—Oblon, Fisher, Spivak, McClelland & Maier

[57] ABSTRACT

A cassette tape winding apparatus comprises a groove formed on an inner circular surface of an annular wheel and a circular elastic member mounted on an outer circumferential surface of a rotary shaft to firmly fit to the groove.

8 Claims, 4 Drawing Figures

CASSETTE TAPE WINDING APPARATUS

BACKGROUND OF THE INVENTION

1. Field of the Invention

The present invention relates to a cassette tape winding apparatus.

2. Description of the Prior Art

Heretofore, an annular wheel on which the cassette tape has been wound (referred to as a hub) has been used in the apparatus for winding a tape such as a magnetic recording tape. The winding apparatus requires stably mounting an annular wheel on a shaft of the winding apparatus in order to wind the tape regularly.

The conventional cassette tape winding apparatus is disclosed, for example, in the Japanese Utility Model Publication No. 109616/1975. The apparatus has annular elastic stoppers arranged in two lines on the outer circumferential surface of the rotary shaft so as to firmly hold the annular wheel between the stoppers. Accordingly, if the annular wheel is not placed in proper position, the annular wheel is easily disposed in an overriding position with respect to either of the stoppers to cause an inclination of the annular wheel to an because of lack of a locating mechanism.

When the annular wheel is inclined in the position, the tape is irregularly wound because of lack of the flange as mentioned before so as to affect the next operations disadvantageously.

SUMMARY OF THE INVENTION

It is therefore an object of the invention to overcome the disadvantages of the prior art and provide an improved cassette tape winding apparatus enabling to locate the annular wheel to be in the right position.

Further objects, features and advantages of the invention will become more apparent from the following description taken in conjunction with the accompanying drawing. The object of the invention can be attained by providing a cassette tape winding apparatus comprising a groove formed on the inner circular surface of an annular wheel and a circular elastic member mounted on the outer circumferential surface of a rotary shaft to firmly fit to the groove.

BRIEF DESCRIPTION OF THE DRAWING

Various other objects, features and attendant advantages of the present invention will be more fully appreciated as the same becomes better understood from the following detailed description when considered in connection with the accompanying drawings in which like reference characters designate like or corresponding parts throughout the several views, and wherein.

DETAILED DESCRIPTION OF THE PREFERRED EMBODIMENTS

Figure 1:
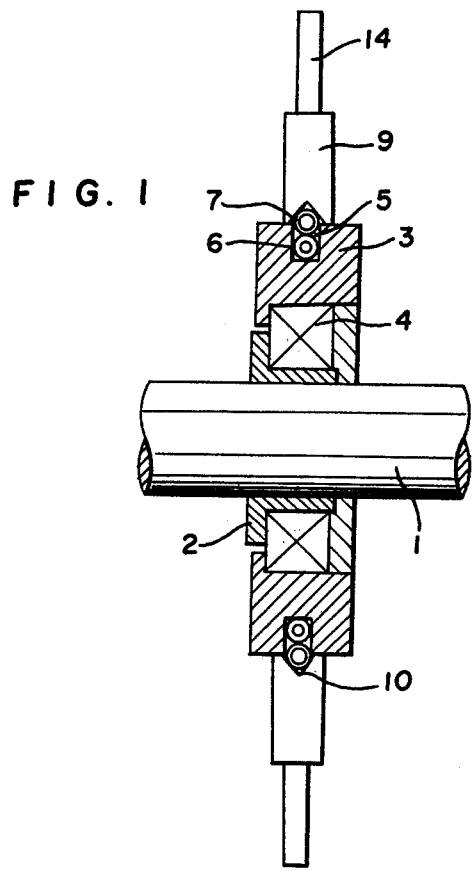
FIG. 1 is a cross-sectional view of the important part of a cassette tape winding apparatus according to the invention.
Figure 2:
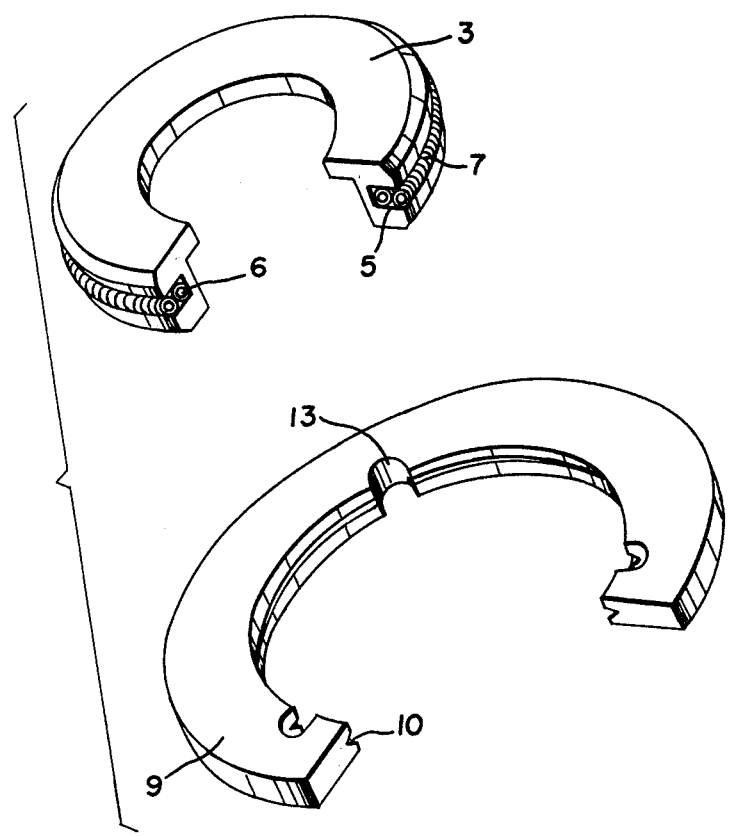
FIG. 2 is a partially broken perspective view of a portion of the invention according to FIG. 1.

Referring to FIGS. 1 and 2, a rotary shaft (3) is rotatably supported through a bearing (4) by a sleeve (2) which is fixed to a winding shaft (1). On the outer circumferential surface, there is provided a circular or annular groove (5), in which a rubber tube (6) of the second elastic member is embedded. A spiral spring (7) of a circular elastic member is mounted on the rubber tube. As is clear from the Figures, the upper half portion of the spiral spring (7) is projected outside of the groove (5). A V-shaped circular or annular groove (10) is formed on the inner circular surface of an annular wheel (9), normally referred to as a hub, so as to firmly fit to or engage the upper half portion of the circular elastic member (7) so as to prevent axial displacement of annular wheel (9) with respect to rotary shaft (3).

Figure 3:
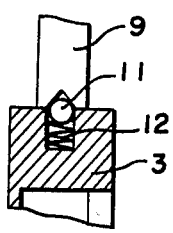
FIG. 3 is a cross-sectional view of a portion of another embodiment of the apparatus according to the present invention.
Figure 4:
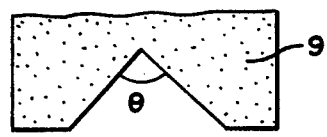
FIG. 4 is a cross-sectional view of a portion of the invention according to in FIG. 2.

In the embodiment shown in FIGS. 3 and 4, a spiral spring is used as a circular elastic member. A structure comprising a ball (11) elastically pushed by a spring (12) which are disposed in cavities formed in a plurality of locations of the circumferential surface of the rotary shaft can be employed as shown in FIG. 3. It is preferable to use the spiral spring rather than the ball (11) to obtain stable fitting because the spring is annularly disposed to the rotary shaft. The groove (10) formed on inner surface of the annular wheel (9) can be of U-shaped groove other than of V-shaped groove. However, the V-shaped groove provides a stability because it can contact at two positions with the circular elastic member. It has been found that the V-shaped groove having 90° of the bottom angle $\theta$ is especially preferred to use (FIG. 4).

A notch (13) formed in the annular wheel (9) is used for locating the same to the other apparatus. The reference numeral (14) designates a tape wound on the wheel.

As stated above, according to the tape winding apparatus of the invention, the annular wheel can be accurately set and the operation of setting and resetting can be easily attained with small force because the operation is done without overriding the annular forcible stopper as provided in the conventional apparatus. Obviously numerous modifications and variations of the present invention are possible in light of the above teachings. It is therefore to be understood that within the scope of the appended claims, the invention may be practiced otherwise than as specifically described herein.

What is claimed is:

1. A cassette tape winding apparatus which comprises:
    an annular wheel, for mounting said tape, having an annular groove provided therein on an inner circular surface of said annular wheel;
    a rotary shaft having a circular groove provided therein;
    an elastic member disposed within said circular groove; and
    a spring member mounted on said elastic member such that the upper half portion of said spring member projects outside of said circular groove and wherein said annular groove firmly engages said upper half portion of said spring member with said annular groove so as to prevent axial displacement of said annular wheel with respect to said rotary shaft.

2. A cassette tape winding apparatus as set forth in claim 1, wherein;
    said annular groove comprises a V-shaped groove forming an angle of substantially 90° so as to contact said elastic members at two positions thereon.

3. A cassette tape winding apparatus as set forth in claim 1, wherein;
   said annular groove comprises a U-shaped groove forming an angle of substantially 90° so as to contact said elastic members at two positions thereon.

4. A cassette tape winding apparatus as set forth in claim 1, wherein;
   the outer circumferential surface of said rotary shaft engages the inner circumferential surface of said annular wheel.

5. A cassette tape winding apparatus which comprises:
   an annular wheel, for mounting said tape, having an annular groove provided therein on an inner circular surface of said annular wheel;
   a rotary shaft including a plurality of cavities formed on the circumferential surface of said rotary shaft;
   a spring member mounted within each of said plurality of cavities; and,
   a ball member mounted on each of said spring members such that the upper half portion of said ball members project outside said cavities and wherein said annular groove firmly engages said upper half portion of said ball members with said annular groove so as to prevent axial displacement of said annular wheel with respect to said rotary shaft.

6. A cassette tape winding apparatus as set forth in claim 5, wherein;
   said annular groove comprises a V-shaped groove forming an angle of substantially 90° so as to contact said ball members at two positions thereon.

7. A cassette tape winding apparatus as set forth in claim 5, wherein;
   said annular groove comprises a U-shaped groove forming an angle of substantially 90° so as to contact said ball members at two positions thereon.

8. A cassette tape winding apparatus as set forth in claim 5, wherein;
   the outer circumferential surface of said rotary shaft engages the inner circumferential surface of said annular wheel.